(12) United States Patent
Zhang et al.

(10) Patent No.: US 10,963,693 B2
(45) Date of Patent: *Mar. 30, 2021

(54) METHOD AND APPARATUS FOR TRAINING A CHARACTER DETECTOR BASED ON WEAK SUPERVISION, SYSTEM AND MEDIUM

(71) Applicant: Baidu Online Network Technology (Beijing) Co., Ltd, Beijing (CN)

(72) Inventors: Chengquan Zhang, Beijing (CN); Jiaming Liu, Beijing (CN); Junyu Han, Beijing (CN); Errui Ding, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,818

(22) Filed: Apr. 21, 2020

(65) Prior Publication Data

US 2020/0250416 A1 Aug. 6, 2020

Related U.S. Application Data

(63) Continuation of application No. 16/110,835, filed on Aug. 23, 2018, now Pat. No. 10,643,066.

(30) Foreign Application Priority Data

Dec. 28, 2017 (CN) .......................... 201711460633.0

(51) Int. Cl.
*G06K 9/00* (2006.01)
*G06K 9/62* (2006.01)
(Continued)

(52) U.S. Cl.
CPC ....... *G06K 9/00463* (2013.01); *G06F 40/169* (2020.01); *G06K 9/6256* (2013.01);
(Continued)

(58) Field of Classification Search
CPC .. G06K 9/6256; G06K 9/6257; G06K 9/6259; G06K 2209/01; G06K 9/00463;
(Continued)

(56) References Cited

U.S. PATENT DOCUMENTS 8,755,595 B1 6/2014 Bissacco et al.
9,378,435 B1 6/2016 Prulhiere et al.
(Continued)

FOREIGN PATENT DOCUMENTS

CN 103679208 A 3/2014
CN 105608456 A 5/2016
(Continued)

OTHER PUBLICATIONS

T. He, W. Huang, Y. Qiao, and J. Yao. Text-attentional convolutional neural network for scene text detection. IEEE Transactions on Image Processing, 25(6):2529-2541, 2016.
M. Jaderberg, A. Vedaldi, and A. Zisserman. Deep features for text spotting. In Proc. of ECCV, pp. 512-528, 2014.
Tian, Y. Pan, C. Huang, S. Lu, K. Yu, and C. Lim Tan. 950 Text flow: A unified text detection system in natural scene images. In Proc. of ICCV, pp. 4651-4659, 2015.
(Continued)

*Primary Examiner* — Geoffrey E Summers
(74) *Attorney, Agent, or Firm* — Akerman LLP

(57) ABSTRACT

A method and apparatus for training a character detector based on weak supervision, a character detection system and a computer readable storage medium are provided, wherein the method includes: inputting coarse-grained annotation information of a to-be-processed object, wherein the coarse-grained annotation information including a whole bounding outline of a word, text bar or line of the to-be-processed object; dividing the whole bounding outline of the coarse-grained annotation information, to obtain a coarse bounding box of a character of the to-be-processed object; obtaining a
(Continued)

predicted bounding box of the character of the to-be-processed object through a neural network model from the coarse-grained annotation information; and determining a fine bounding box of the character of the to-be-processed object as character-based annotation of the to-be-processed object, according to the coarse bounding box and the predicted bounding box.

14 Claims, 4 Drawing Sheets

(51) Int. Cl.
    *G06N 3/04*     (2006.01)
    *G06N 3/08*     (2006.01)
    *G06F 40/169*     (2020.01)

(52) U.S. Cl.
    CPC ............... *G06N 3/04* (2013.01); *G06N 3/08* (2013.01); *G06K 2209/01* (2013.01)

(58) Field of Classification Search
    CPC .... G06K 9/6271; G06K 9/2054; G06K 9/342; G06T 2207/30176; G06N 3/04; G06N 3/08; G06N 3/0454; G06N 3/084; G06F 40/169
    USPC .......................... 382/177, 156–158, 181, 185
    See application file for complete search history.

(56) References Cited

U.S. PATENT DOCUMENTS

| | | |
|---|---|---|
| 2011/0299779 A1 | 12/2011 | Ferman et al. |
| 2015/0055866 A1 | 2/2015 | Cummins et al. |

FOREIGN PATENT DOCUMENTS

| | | |
|---|---|---|
| CN | 106407981 A | 2/2017 |
| CN | 106845530 A | 6/2017 |

OTHER PUBLICATIONS

S. Zhu and R. Zanibbi. A text detection system for natural scenes with convolutional feature learning and cascaded classification. In Proc. of CVPR, pp. 625-632, 2016.
S. Tian, S. Lu, and C. Li. Wetext: Scene text detection under weak supervision. In Proc. of ICCV, 2017.
H. Hu, C. Zhang, Y. Luo, Y. Wang, J. Han, and E. Ding. Wordsup: Exploiting word annotations for character based text detection. arXiv preprint arXiv:1708.06720, 2017.
D. Karatzas, L. Gomez-Bigorda, A. Nicolaou, S. Ghosh, A. Bagdanov, M. Iwamura, J. Matas, L. Neumann, V. R. Chandrasekhar, S. Lu, et al. ICDAR 2015 competition on robust reading. In Proc. of ICDAR, pp. 1156-1160. IEEE, 2015.
A. Veit, T. Matera, L. Neumann, J. Matas, and S. Belongie. Coco-text: Dataset and benchmark for text detection and recognition in natural images. In arXiv preprintarXiv:1601.07140, 2016.
C. K. Chng and C. S. Chan. Total-text: A comprehensive dataset for scene text detection and recognition. CoRR, abs/1710.10400, 2017.
S. Ren, K. He, R. B. Girshick, and J. Sun. Faster R-CNN: towards real-time object detection with region proposal net-works. In NIPS, pp. 91-99, 2015.
W. Liu, D. Anguelov, D. Erhan, C. Szegedy, S. E. Reed, C. Fu, and A. C. Berg. SSD: single shot multibox detector. In ECCV, pp. 21-37, 2016.
L. Huang, Y. Yang, Y. Deng, and Y. Yu. DenseBox: Unifying landmark localization with end to end object detection. CoRR, abs/1509.04874, 2015.
J. Dai, Y. Li, K. He, and J. Sun. R-FCN: Object detection via region-based fully convolutional networks. In NIPS, 2016.
Tian, Shangxuan, Shijian Lu, and Chongshou Li. "WeText: Scene Text Detection under Weak Supervision." 2017 IEEE International Conference on Computer Vision (ICCV). IEEE, 2017. (Year: 2017).
Hu, Han, et al. "WordSup: Exploiting Word Annotations for Character Based Text Detection." 2017 IEEE International Conference on Computer Vision (ICCV). IEEE, 2017. (Year: 2017).
Office Action issued in 201711460633.0, dated Sep. 4, 2018.
Office Action issued in 201711460633.0, dated Dec. 28, 2017.
Cong, "Research on Text Detection and Recognition in Natural Images," Huazhong University of Science and Tchnology, Wuhan, Hubei, P.R. China, May 2014.

METHOD AND APPARATUS FOR TRAINING A CHARACTER DETECTOR BASED ON WEAK SUPERVISION, SYSTEM AND MEDIUM

CROSS-REFERENCE TO RELATED APPLICATION

This application is a continuation of U.S. patent application Ser. No. 16/110,835, filed Aug. 23, 2018, which claims priority to Chinese Patent Application No. 201711460633.0, filed Dec. 28, 2017, the entire contents of both of which are hereby incorporated by reference.

TECHNICAL FIELD

The present disclosure relates to the field of information technologies, and particularly to a method and apparatus for training a character detector based on weak supervision, a character detection system and a computer readable storage medium.

BACKGROUND

In the field of Optical Character Recognition (OCR) character detection and recognition, since a single character-level annotation manner (e.g., character position annotation) needs to consume a lot of manpower and material resources, some current data sets in an open source real scenario are inclined to annotate an whole bounding outline of a whole word or a text bar, and text information of the whole word or the whole text bar. Such annotation manner eases annotation difficulty and costs to a certain degree, but brings about some negative influence, e.g., some typical character detection methods based on the character level cannot be effectively trained and adjusted based on these real scenario data annotated based on words and text bars. From the visual perspective, no matter how language types change, characters are the most fundamental units of words. Character detection methods based on character units are more likely to build a character detection engine under a general-purpose scenario (including horizontal, multi-directional, distorted and transmissive). Hence, a problem currently to be solved is to automatically generate character-based annotation information according to annotation information based on a word, text bar or line in the current annotation data set.

SUMMARY

A method and apparatus for training a character detector based on weak supervision, a character detection system and a computer readable storage medium are provided according to embodiments of the present disclosure, to solve at least one of the above technical problems in the existing technology.

In a first aspect, a method for training a character detector based on weak supervision is provided according to an embodiment of the disclosure. The method includes: inputting coarse-grained annotation information of a to-be-processed object, wherein the coarse-grained annotation information is a whole bounding outline of a word, text bar or line of the to-be-processed object; dividing the coarse-grained annotation information, to obtain a coarse bounding box of a character of the to-be-processed object; obtaining a predicted bounding box of the character of the to-be-processed object through a neural network model from the coarse-grained annotation information; and determining a fine bounding box of the character of the to-be-processed object as character-based annotation of the to-be-processed object, according to the coarse bounding box and the predicted bounding box.

In conjunction with the first aspect, in a first implementation mode of the first aspect of the present disclosure, the whole bounding outline includes a polygon.

In conjunction with the first implementation mode of the first aspect, in a second implementation mode of the first aspect of the present disclosure, dividing the coarse-grained annotation information, to obtain a coarse bounding box of a character of the to-be-processed object includes: equally dividing the polygon of the coarse-grained annotation information into N portions, wherein a direction perpendicular to a long axis of the polygon is an extension direction of a division line; and N is the number of character in the coarse-grained annotation information, or is an integer obtained by rounding a quotient obtained by dividing a length of the long axis of the polygon by a length of the shortest edge of the polygon.

In conjunction with the first aspect, in a third implementation mode of the first aspect of the present disclosure, determining a fine bounding box of the character of the to-be-processed object according to the coarse bounding box and the predicted bounding box includes: determining whether both a first condition and a second condition are satisfied, the first condition being that a confidence of the predicted bounding box is larger than a preset confidence threshold, and the second condition being that an overlap ratio of the coarse bounding box to the predicted bounding box is larger than a preset overlap ratio threshold; adjusting the coarse bounding box based on the predicted bounding box, to generate the fine bounding box, in a case that both the first condition and the second condition are satisfied; and determining boundaries of the coarse bounding box as boundaries of the fine bounding box, in a case that at least one of the first condition and the second condition is not satisfied.

In conjunction with the second implementation mode of the first aspect, in a fourth implementation mode of the first aspect of the present disclosure, adjusting the coarse bounding box based on the predicted bounding box, to generate the fine bounding box includes: determining whether an angle between a long axis and a transverse axis of the whole bounding outline of the coarse-grained annotation information is less than or equal to 45°; in a case that the angle is less than or equal to 45°, determining upper and lower boundaries of the coarse bounding box as upper and lower boundaries of the fine bounding box respectively, and determining left and right boundaries of the predicted bounding box as left and right boundaries of the fine bounding box respectively; in a case that the angle is larger than 45°, determining upper and lower boundaries of the coarse bounding box as left and right boundaries of the fine bounding box respectively, and determining left and right boundaries of the predicted bounding box as upper and lower boundaries of the fine bounding box respectively.

In conjunction with the first aspect, the first implementation mode of the first aspect, the second implementation mode of the first aspect, the third implementation mode of the first aspect or the fourth implementation mode of the first aspect, after determining a fine bounding box of the character of the to-be-processed object according to the coarse bounding box and the predicted bounding box, the method further includes: calculating a loss function of the neural network model according to the fine bounding box; and updating a parameter value of the neural network model through an error back-propagation algorithm, based on the loss function.

In a second aspect, an apparatus for training a character detector based on weak supervision is provided according to an embodiment of the disclosure. The apparatus includes: an input module configured to input coarse-grained annotation information of a to-be-processed object, wherein the coarse-grained annotation information is a whole bounding outline of a word, text bar or line of the to-be-processed object; a character coarse positioning module configured to divide the coarse-grained annotation information, to obtain a coarse bounding box of a character of the to-be-processed object; the character detector configured to obtain a predicted bounding box of the character of the to-be-processed object through a neural network model from the coarse-grained annotation information; and a character adjusting module configured to determine a fine bounding box of the character of the to-be-processed object as character-based annotation of the to-be-processed object, according to the coarse bounding box and the predicted bounding box.

In conjunction with the second aspect, in a first implementation mode of the second aspect of the present disclosure, the whole bounding outline includes a polygon.

In conjunction with the first implementation mode of the second aspect, in a second implementation mode of the second aspect of the present disclosure, the character coarse positioning module is further configured to: equally divide the polygon of the coarse-grained annotation information into N portions, wherein a direction perpendicular to a long axis of the polygon is an extension direction of a division line; and N is the number of character in the coarse-grained annotation information, or is an integer obtained by rounding a quotient obtained by dividing a length of the long axis of the polygon by a length of the shortest edge of the polygon.

In conjunction with the second aspect, in a third implementation mode of the second aspect of the present disclosure, the character adjusting module further includes: a determining submodule configured to determine whether both a first condition and a second condition are satisfied, the first condition being that a confidence of the predicted bounding box is larger than a preset confidence threshold, and the second condition being that an overlap ratio of the coarse bounding box to the predicted bounding box is larger than a preset overlap ratio threshold; a first adjusting submodule configured to adjust the coarse bounding box based on the predicted bounding box, to generate the fine bounding box, in a case that both the first condition and the second condition are satisfied; and a second adjusting submodule configured to determine boundaries of the coarse bounding box as boundaries of the fine bounding box, in a case that at least one of the first condition and the second condition is not satisfied.

In conjunction with the second implementation mode of the second aspect, in a fourth implementation mode of the second aspect of the present disclosure, the first adjusting submodule is further configured to: determine whether an angle between a long axis and a transverse axis of the whole bounding outline of the coarse-grained annotation information is less than or equal to 45°; in a case that the angle is less than or equal to 45°, determine upper and lower boundaries of the coarse bounding box as upper and lower boundaries of the fine bounding box respectively, and determine left and right boundaries of the predicted bounding box as left and right boundaries of the fine bounding box respectively; in a case that the angle is larger than 45°, determine upper and lower boundaries of the coarse bounding box as left and right boundaries of the fine bounding box respectively, and determine left and right boundaries of the predicted bounding box as upper and lower boundaries of the fine bounding box respectively.

In conjunction with the second aspect, the first implementation mode of the second aspect, the second implementation mode of the second aspect, the third implementation mode of the second aspect or the fourth implementation mode of the second aspect, the apparatus further includes a parameter updating module configured to: calculate a loss function of the neural network model according to the fine bounding box, and update a parameter value of the neural network model through an error back-propagation algorithm, based on the loss function.

In a possible design, the structure of the apparatus for training a character detector based on weak supervision includes a processor and a memory, the memory being used to store a program of supporting the apparatus for training a character detector based on weak supervision to execute a program for the method apparatus for training a character detector based on weak supervision, the processor being configured to execute the program stored in the memory.

In a third aspect, a character detection system is provided according to an embodiment of the present disclosure. The character detection system includes: one or more processors; a storage device for storing one or more programs; the one or more programs, when executed by said one or more processors, enable said one or more processors to implement the method according to the abovementioned first aspect.

In a fourth aspect, a non-volatile computer readable storage medium is provided according to an embodiment of the present disclosure, in which a computer program is stored, wherein the computer program, when executed by a processor, implements the method according to the abovementioned first aspect.

A technical solution among the above technical solutions has the following advantages or advantageous effects: more character detection data sets can be used to train the character detector (particularly based on a data set only having word or text bar-level annotation), so that the model is substantially improved in respect of character-level detection precision, and the character information mining precision in the current OCR technology can be enhanced substantially.

Another technical solution among the above technical solutions has the following advantages or advantageous effects: a polygon is used for text annotation under some more general-purpose character scenarios such as in the case of distortion and projection change employs. The above technical solution has a very high success rate under these character scenarios.

The above summary is only intended for description purpose, not to limit in any manner. In addition to illustrative aspects, implementation modes and features described above, further aspects, implementation modes and features of the present disclosure will be made apparent by referring to drawings and the following detailed depictions.

BRIEF DESCRIPTION OF DRAWINGS

In the figures, unless otherwise specified, reference numbers throughout a plurality of figures represent the same or like components or elements. These figures are not certainly drawn by scale. It should be appreciated that these figures only depict some embodiments according to the present disclosure, and should not be considered as limiting the scope of the present disclosure.

DETAILED DESCRIPTION OF EMBODIMENTS

The following text only simply describes some exemplary embodiments. As recognized by those skilled in the art, it is possible to modify the described embodiments in various manners without departing from the spirit or scope of the present disclosure. Hence, the figures and depictions are considered as being substantially exemplary not restrictive.

Figure 1:
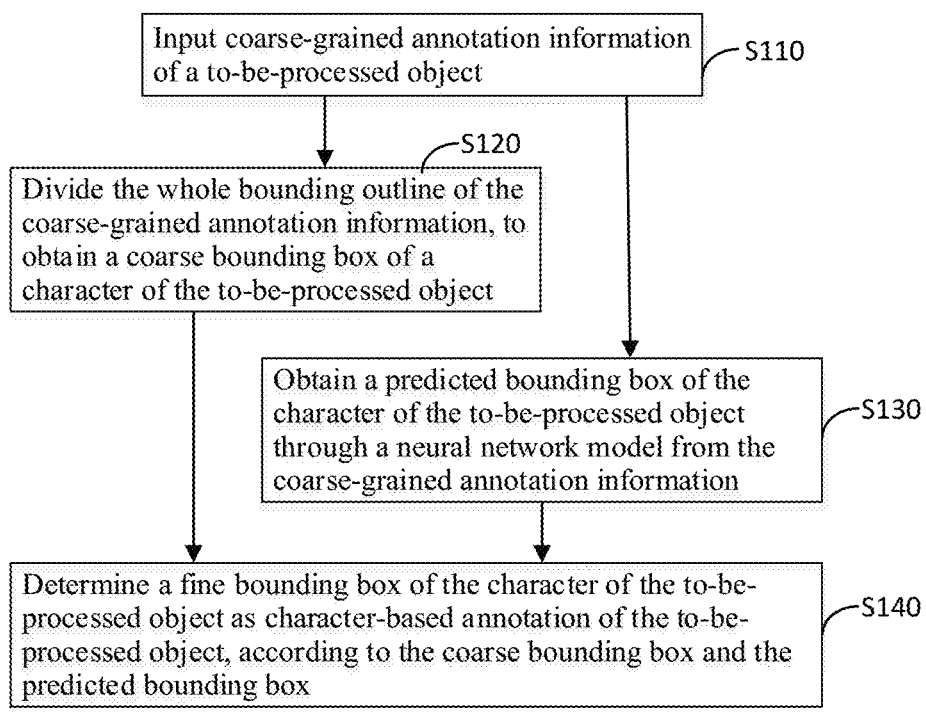
FIG. 1 is a flow chart of a method for training a character detector based on weak supervision according to an embodiment of the present disclosure.

A method for training a character detector based on weak supervision is provided according to an embodiment of the disclosure. FIG. 1 is a flow chart of a method for training a character detector based on weak supervision according to an embodiment of the present disclosure. As shown in FIG. 1, the method for training a character detector based on weak supervision according to the embodiment of the present disclosure includes: step S110, inputting coarse-grained annotation information of a to-be-processed object, wherein the coarse-grained annotation information including a whole bounding outline of a word, text bar or line of the to-be-processed object; step S120, dividing the whole bounding outline of the coarse-grained annotation information, to obtain a coarse bounding box of a character of the to-be-processed object; step S130, obtaining a predicted bounding box of the character of the to-be-processed object through a neural network model from the coarse-grained annotation information; step S140, determining a fine bounding box of the character of the to-be-processed object as character-based annotation of the to-be-processed object, according to the coarse bounding box and the predicted bounding box.

In the field of OCR character detection and recognition, training and learning may be performed based on samples with annotation information. For example, the annotation information may include word bar-level annotation information which includes a position of a word bar in a picture and text information of the word bar. The position of the word bar may be annotated with a whole bounding outline of the whole word or text bar, for example, a rectangular box or polygonal box in which the word bar is bounded. Learning is performed through a lot of sample training examples with annotation information, to thereby build a model to predict annotation of unseen examples. Some current real scenario data sets in open source such as ICDAR15, COCO-Text, and Total-Text are inclined to annotate an whole bounding outline of a whole word or whole text bar and text information of the whole word or whole text bar. In an embodiment of the present disclosure, it is possible to generate character-level annotation information according to an existing annotation including the whole bounding outline of the whole word or whole text bar and text information of the whole word or whole text bar. A coarse bounding box of a character is obtained by dividing the polygon of the coarse-grained annotation information, and the obtained coarse bounding box is matched with a predicted bounding box of the character obtained through the neural network model. A fine bounding box of the character is determined according to a preset adjustment rule and scheme, thereby generating the character-level annotation information. Particularly, in an application occasion of a data set only having word or text bar-level annotation, the character detector can be trained by more character detection data sets, so that the model is substantially improved in character-level detection precision.

In an implementation mode of the method for training a character detector based on weak supervision according to the present disclosure, the word, text bar and/or line-based annotation information is a whole bounding outline of the word, text bar and/or line, and the whole bounding outline includes a polygon or rectangular box. In the embodiment of the present disclosure, it is possible to generate a bounding outline of each character in the word, text bar or line according to the whole bounding outline of the word, text bar or line, i.e., obtain character-level annotation information from the word bar-level annotation information.

In an implementation mode of the method for training the character detector based on weak supervision according to the present disclosure, in step S120 of FIG. 1, the whole bounding outline of the coarse-grained annotation information is divided, to obtain a coarse bounding box of a character of the to-be-processed object. Specifically, the step S102 includes: equally dividing the polygon of the coarse-grained annotation information into N portions, wherein a direction perpendicular to a long axis of the polygon is an extension direction of a division line, N is the number of character in the coarse-grained annotation information, or N is an integer obtained by rounding a quotient obtained by dividing a length of a long axis of the polygon by a length of the shortest edge of the polygon.

Figure 2:
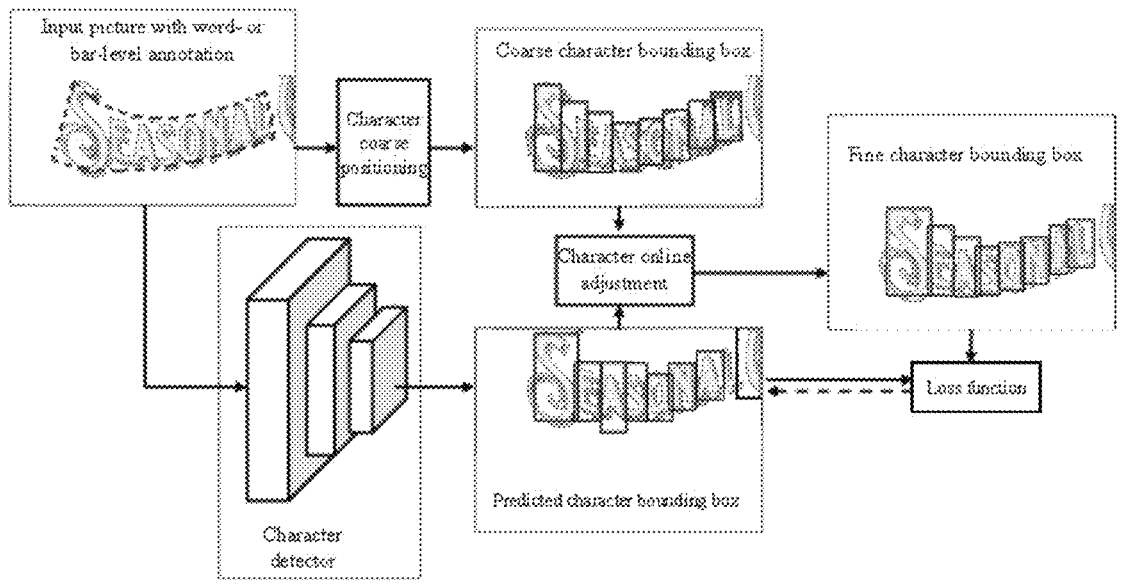
FIG. 2 is a schematic diagram of a method for training a character detector based on weak supervision according to a preferred embodiment of the present disclosure.

FIG. 2 is a schematic diagram of a method for training a character detector based on weak supervision according to a preferred embodiment of the present disclosure. In the process of training a character detector based on a word or text bar annotation as shown in FIG. 2, upon activation of training of the character detector, a picture with word/text bar annotation is input; a character coarse positioning module follows up annotated content and generates coarse character bounding box information, namely, a character bounding box, also called a coarse bounding box of a character, as show in FIG. 2. In addition, the character detector, upon forward propagation, currently generates a predicted candidate character bounding box, namely, a predicted character bounding box, also called a predicted bounding box of the character, as shown in FIG. 2. Then, a character online adjusting module adjusts the coarse bounding box of the character according to the predicted bounding box of the character, and outputs a more accurate and finer character bounding box, namely, a fine character bounding box, also called a fine bounding box of the character, as shown in FIG. 2, as tag informant of the current training. Through computation of a loss function, supervision information of the current tag is back-propagated to the character detector so that the character detector completes a new round of parameter update (namely, learning).

Referring to FIGS. 1 and 2, in step S110, coarse-grained annotation information of a to-be-processed object is input. Namely, as shown in FIG. 2, the input picture with word- or bar-level annotation is input. Conventional input data for training of a character detection device is required to have annotation information of accurate single character position. In contrast, according to the embodiment of the present disclosure, only require word-, text bar- or line-level annotation information is required. An annotation form may be a polygon of any shape, for example the distorted polygonal annotation as shown in FIG. 2.

After the step S110 of inputting coarse-grained annotation information of a to-be-processed object, step S120 is executed. That is, after the input picture with word- or bar-level annotation in FIG. 2 is input, character coarse positioning processing is performed to obtain the coarse bounding box of the character, namely, the coarse character bounding box in FIG. 2. It is possible to, according to a given polygon with word- or bar-level annotation, evenly divide the polygon into N portions following the long axis of the polygon. If the annotation includes a text, N is equal to the number of character of the annotation. If the annotation does not include a text, N is equal to a multiple of a quotient obtained by diving the length of the long axis of the polygon by the length of the shortest edge thereof. According to the aforesaid method, the polygon of the input coarse-grained annotation information is divided, and the coarse bounding box of the character, namely, coarse character bounding box as shown in FIG. 2, is output.

In the embodiment shown in FIG. 1, after step S110, step S120 and step 130 may be executed in parallel, and it is also possible to execute step S120 and then execute S130 in series, or execute step S130 first and then execute step S120. Referring to FIGS. 1 and 2, step S130 corresponding to the character detector in FIG. 2 implements prediction of a character position and a bounding box, to obtain a predicted character bounding box, namely, a predicted bounding box of the character. The neural network model in this step may be replaced with general-purpose object detection depth convolutional network architectures such as Faster RCNN (Regions with Convolutional Neural Network), SSD (Single Shot MultiBox Detector), and DenseBox, R-FCN (Region-based Fully Convolutional Network).

Figure 3:
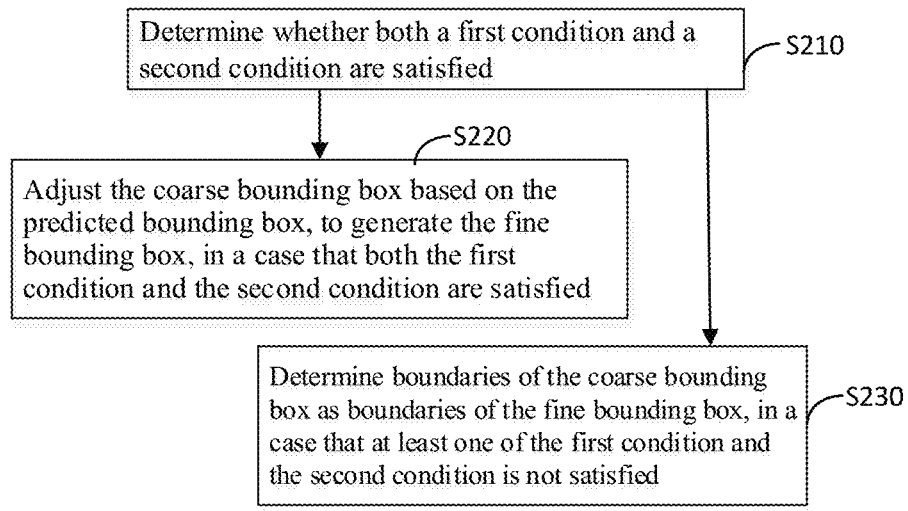
FIG. 3 is a flow chart of a method for training a character detector based on weak supervision according to a preferred embodiment of the present disclosure.

FIG. 3 is a flow chart of a method for training a character detector based on weak supervision according to a preferred embodiment of the present disclosure. As shown in FIGS. 1 to 3, in an implementation mode of the method for training a character detector based on weak supervision according to the present disclosure, in step S140, a fine bounding box of a character of the to-be-processed object is determined according to the coarse bounding box and the predicted bounding box. Specifically, the step S140 includes: step S210, determining whether both a first condition and a second condition are satisfied, the first condition being that a confidence of the predicted bounding box is larger than a preset confidence threshold, and the second condition being that an overlap ratio of the coarse bounding box to the predicted bounding box is larger than a preset overlap ratio threshold; step S220, adjusting the coarse bounding box based on the predicted bounding box, to generate the fine bounding box, in a case that both the first condition and the second condition are satisfied; and step 230: determining boundaries of the coarse bounding box as boundaries of the fine bounding box, in a case that at least one of the first condition and the second condition is not satisfied.

Further referring to FIG. 2, after the coarse character bounding box and predicted character bounding box are obtained, characters are adjusted online. A tag of the coarse character bounding box is adjusted according to the current prediction result of the character detector. According to a preset adjustment rule and scheme, a finer and accurate character bounding box, namely, a fine bounding box, may be output as a learning tag of the detector.

Figure 4:
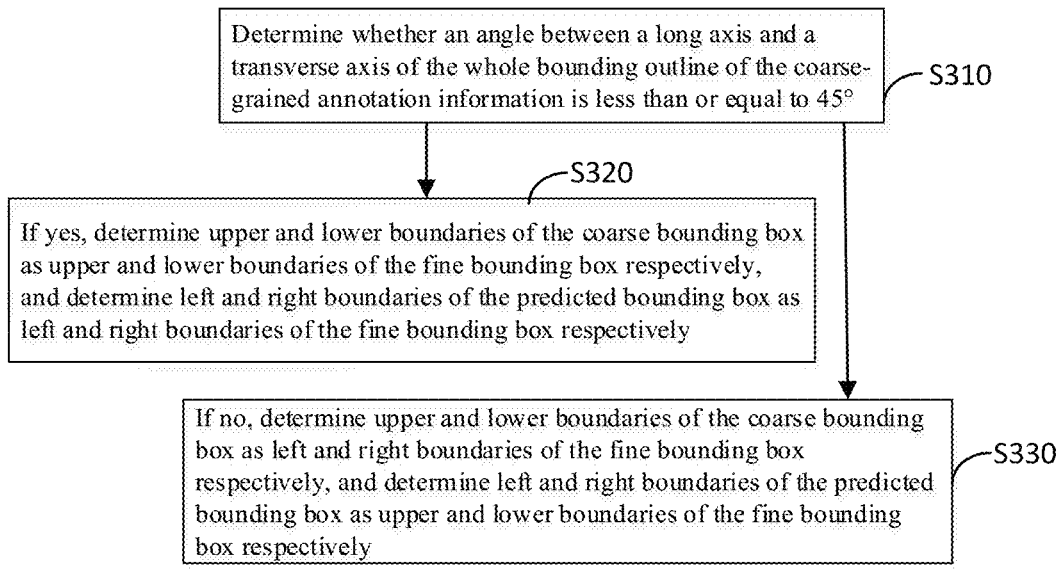
FIG. 4 is a flow chart of a method for training a character detector based on weak supervision according to another preferred embodiment of the present disclosure.

FIG. 4 is a flow chart of a method for training a character detector based on weak supervision according to another preferred embodiment of the present disclosure. As shown in FIG. 4, in an implementation mode of the method for training a character detector based on weak supervision according to the present disclosure, in step S220, the coarse bounding box is adjusted according to the predicted bounding box, to generate the fine bounding box. Specifically, the step S220 includes: step S310, determining whether an angle between a long axis and a transverse axis of the whole bounding outline of the coarse-grained annotation information is less than or equal to 45°; step S320, in a case that the angle is less than or equal to 45°, determining upper and lower boundaries of the coarse bounding box as upper and lower boundaries of the fine bounding box respectively, and determining left and right boundaries of the predicted bounding box as left and right boundaries of the fine bounding box respectively; and step S330: in a case that the angle is larger than 45°, determining upper and lower boundaries of the coarse bounding box as left and right boundaries of the fine bounding box respectively, and determining left and right boundaries of the predicted bounding box as upper and lower boundaries of the fine bounding box respectively.

Referring to FIGS. 2 and 4, the character online adjustment step may include: adjusting the coarse bounding box according to the predicted bounding box, taking the coarse character bounding box as a reference character bounding box, and adjusting reference character bounding box with the assistant of the predicted character bounding box, to generate a final fine character bounding box. The coarse character bounding box is represented with $B_c$, the predicted character bounding box is represented with $B_p$, and the fine character bounding box is represented with $B_f$. The adjustment rule and scheme is described below in detail:

(1) Several coarse character bounding boxes are obtained through character coarse positioning, and several predicted character bounding boxes are currently obtained as a predicted character bounding box set by one forward propagation of the character detector.

(2) Given a coarse character bounding box $B_c$, a predicted character bounding box $B_p$ matched with the coarse character bounding box $B_c$ is found from the predicted character bounding box set by the following two conditions:

$$S(B_p) > T1 \qquad (1)$$

$$IoU(B_c, B_p) > T2 \qquad (2)$$

where $S(B_p)$ represents a confidence of the predicted character bounding box, $IoU(B_c, B_p)$ represents a crossover ratio of the predicted character bounding box $B_p$ to the coarse character bounding box $B_c$, and values of T1 and T2 may be determined according to empirical values obtained from experiments.

(3) If the predicted character bounding box $B_p$ matched with the coarse character bounding box $B_c$ is found in step (2), $B_c$ is adjusted according to the predicted character bounding box to generate the fine character bounding box $B_f$. An adjustment rule is as follows: if a main axis (namely, long axis) of the word or text bar annotation where $B_c$ lies is inclined to be a horizontal direction, namely, the angle between the main axis and the transverse axis is less than or equal to 45°, upper and lower boundaries of $B_f$ correspond to upper and lower boundaries of $B_c$, and left and right boundaries of $B_f$ correspond to left and right boundaries of $B_p$. On the contrary, if the main axis of the word or text bar annotation where $B_c$ lies is inclined to be a vertical direction, left and right boundaries of $B_f$ correspond to upper and lower boundaries of $B_c$, and upper and lower boundaries of $B_f$ correspond to left and right boundaries of $B_p$. The shortest side of the word- or text bar-level annotation is usually compact and close to the text bar, so such design can also maximize the value of annotation information. Furthermore, usually the upper and lower boundaries of the coarse character bounding box obtained by character coarse positioning are positioned with a higher accuracy rate, and the left and right boundaries of the predicted character bounding box obtained through the character detector are positioned with a higher accuracy rate. In the aforesaid method, the most optimized data are selected to generate boundaries of the fine character bounding box. In addition, by using the above adjustment method, application scenarios of the embodiments of the present disclosure not limited to a case in which the bar annotation box assumes a linear distribution. In some cases under more general-purpose word scenarios such as distortion and projection change, the text annotation is in a polygonal shape. A success rate of the embodiment of the present disclosure on this application scenario is high.

(4) If the predicted character bounding box matched with the coarse character bounding box $B_c$ is not found in step (2), boundaries of $B_c$ may be directly determined as boundaries of $B_f$.

As stated above, the embodiment of the present disclosure is not only adapted for the case in which the text annotation form assumes a linear distribution, but also for a case in which the text annotation form is in a polygonal shape. In an existing technology, the OCR character detection methods may be classified into four large types: intercommunication component-based detection method, character-based detection method, word-based detection method, and text bar-based detection method. The character-based detection method includes two large types: strongly-supervised character detector learning method and weakly-supervised character detector learning method. The strongly-supervised method is trained on a set of a small amount of data of character-based annotation, and additionally needs to be sufficiently trained based on a set of a lot of synthesized virtual data with character annotation. The character detector may be trained based on word- or bar-level annotation according to the weakly-supervised method. However, the design of the method is based on a strong assumption that these word or bar annotation boxes need to assume a linear distribution as much as possible.

As compared with other three types of character detection methods, the character-based detection method adopts characters as basic units with meaning, which have definite structure definitions, and can provide rich information such as position, size and reading direction. However, the other three types of character detection methods cannot provide so. A character detection engine based on characters is a visually most direct detect framework. However, the character detection methods in the existing technology have the following technical drawbacks: strongly-supervised learning-based character detector needs a lot of character-level annotation information and requires larger costs of manpower and material resources. Although with aid of a lot of synthesized virtual data, the strongly-supervised learning-based character detector still cannot effectively fit real scenario data. The design of the current weakly-supervise learning manner method excessively depends on the annotation form in which word or text bar assumes an approximately straight line shape. Text annotation form under some more general-purpose character scenarios such as in the case of distortion and projection change employs a polygon, for example, Total-Text data set. These methods may fail in a large degree. Embodiments of the present disclosure overcome the drawbacks of the above existing technology, and improve the accuracy of character recognition.

In an implementation mode of the method for training a character detector based on weak supervision according to the present disclosure, after determining the fine bounding box of the character of the to-be-processed object according to the coarse bounding box and the predicted bounding box, the method further includes: calculating a loss function of the neural network model according to the fine bounding box, and updating a parameter value of the neural network model through an error back-propagation algorithm, based on the loss function.

The error backpropagation algorithm is called BP (Backpropagation algorithm). The error backpropagation algorithm mainly includes two phases, i.e., excitation of propagation and weight update, both of which are cycled and iterated repeatedly, until the network's response to the input reaches a predetermined target range. The learning procedure of the BP algorithm includes a forward propagation procedure and a backpropagation procedure. During the forward propagation, input information is processed through an input layer and a hidden layer in a layer-by-layer manner and transferred to an output layer. If a desired output value is not obtained at the output layer, a quadratic sum of the output and a desired error is taken as a target function, which is turned to a backpropagation. Partial derivatives of the target function with respect to respective weight values of neuron nodes are solved in a layer-by-layer manner, to form a gradient of the target function with respect to a weight value vector, as a basis for modifying a weight value. The network learning is completed during weight value modification. When the error reaches a desired value, the network learning ends. The phase of propagation in each time of iteration includes two steps: 1, (forward propagation phase) sending a training input into the network to obtain an excitation response; 2, (Backward propagation phase) solving a difference between the excitation response and a target output corresponding to the training input, thereby obtaining a response error of the hidden layer and the output layer.

Referring to FIG. 2, after the fine character bounding box is determined, the fine character bounding box information $B_f$ obtained through adjustment is used to supervise parameter update of the current character detector. Specifically, the fine character bounding box obtained by the online adjustment are regarded as a learning tag of the detector, and used to guide loss function calculation of the model learning. Parameters of the character detector are updated through a gradient backpropagation mechanism to achieve the purpose of model learning. The loss function, also called cost function, is a target function of neural network optimization. The procedure of neural network training or the procedure of optimization is a procedure of minimizing the loss function. When the loss function becomes smaller, a value of a corresponding predicted result gets closer to a value of a real result.

Figure 5:
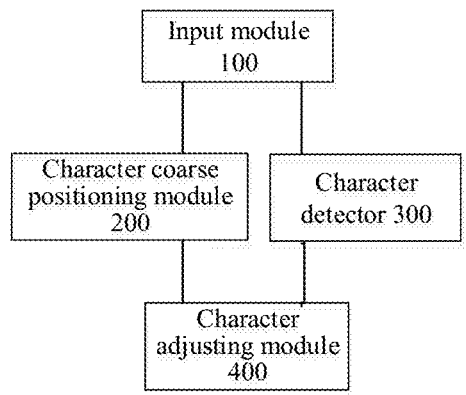
FIG. 5 is an overall block diagram of an apparatus for training a character detector based on weak supervision according to embodiments of the present disclosure.

In another aspect, an apparatus for training a character detector based on weak supervision is provided according to an embodiment of the present disclosure. FIG. 5 is an overall block diagram of an apparatus for training a character detector based on weak supervision according to embodiments of the present disclosure. As shown in FIG. 5, the apparatus for training a character detector based on weak supervision according to embodiments of the present disclosure includes: an input module 100 configured to input coarse-grained annotation information of a to-be-processed object, wherein the coarse-grained annotation information including a whole bounding outline of a word, text bar or line of the to-be-processed object; a character coarse positioning module 200 configured to divide the whole bounding outline of the coarse-grained annotation information, to obtain a coarse bounding box of a character of the to-be-processed object; a character detector 300 configured to obtain a predicted bounding box of the character of the to-be-processed object through a neural network model from the coarse-grained annotation information; a character adjusting module 400 configured to determine a fine bounding box of the character of the to-be-processed object as character-based annotation of the to-be-processed object, according to the coarse bounding box and the predicted bounding box.

In an implementation mode of the apparatus for training a character detector based on weak supervision according to the present disclosure, the whole bounding outline includes a polygon.

Referring to FIG. 1-FIG. 5, the input module 100 is configured to input a picture with word/text bar annotation, the character coarse positioning module 200 follows up annotated content and generates coarse character bounding box information, to obtain the coarse bounding box of the character of the to-be-process object; at the same time, the character detector 300, upon the current forward propagation, generates a predicted candidate character bounding box, namely, a predicted bounding box of a character, and the character detector may use a general-purpose object detection depth convolutional network framework to achieve prediction of a character position and a bounding box; then character adjusting module 400 adjusts the coarse character bounding box according to the predicted bounding box, and outputs a more accurate and finer character bounding box, namely, a fine bounding box of a character, as tag information of the current training.

In an implementation mode of the apparatus for training a character detector based on weak supervision according to the present disclosure, the character coarse positioning module 200 is further configured to: equally divide the polygon of the coarse-grained annotation information into N portions, wherein a direction perpendicular to a long axis of the polygon is an extension direction of a division line; and N is the number of character in the coarse-grained annotation information, or is an integer obtained by rounding a quotient obtained by dividing a length of the long axis of the polygon by a length of the shortest edge of the polygon.

Figure 6:
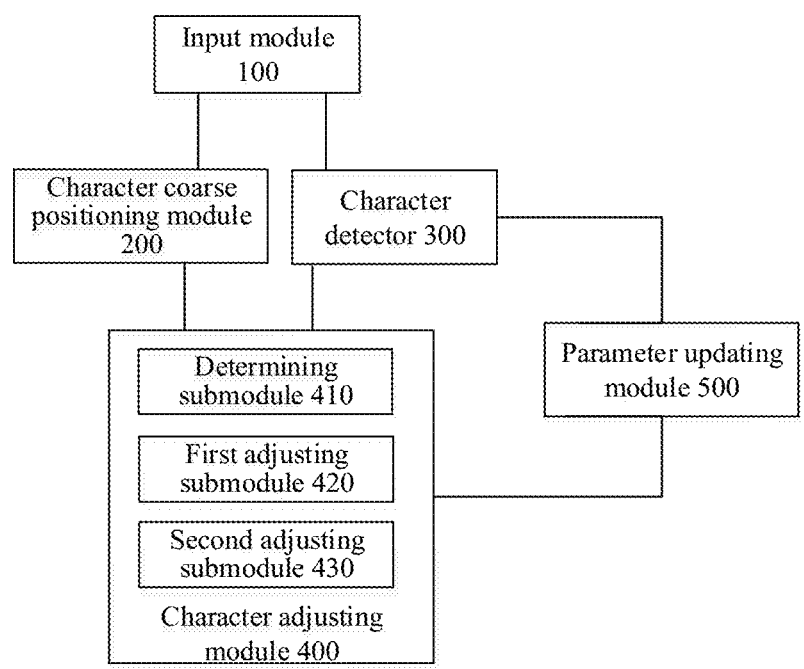
FIG. 6 is a structural schematic diagram of an apparatus for training a character detector based on weak supervision according to a preferred embodiment of the present disclosure.

FIG. 6 is a structural schematic diagram of an apparatus for training a character detector based on weak supervision according to a preferred embodiment of the present disclosure. As shown in FIG. 6, in an implementation mode of the apparatus for training a character detector based on weak supervision according to the present disclosure, the character adjusting module 400 further includes: a determining submodule 410 configured to determine whether both a first condition and a second condition are satisfied, the first condition being that a confidence of the predicted bounding box is larger than a preset confidence threshold, and the second condition being that an overlap ratio of the coarse bounding box to the predicted bounding box is larger than a preset overlap ratio threshold; a first adjusting submodule 420 configured to adjust the coarse bounding box based on the predicted bounding box, to generate the fine bounding box, in a case that both the first condition and the second condition are satisfied; a second adjusting submodule 430 configured to determine boundaries of the coarse bounding box as boundaries of the fine bounding box, in a case that at least one of the first condition and the second condition is not satisfied. The fine bounding box is generated by adjusting the coarse bounding box according to the predicted bounding box. Regarding detailed description of its adjustment rule and scheme, please refer to the description of the embodiment of the method for training a character detector based on weak supervision.

According to an implementation mode of the apparatus for training a character detector based on weak supervision of the present disclosure, the first adjusting submodule 420 is further configured to: determine whether an angle between a long axis and a transverse axis of the whole bounding outline of the coarse-grained annotation information is less than or equal to 45°; in a case that the angle is less than or equal to 45°, determine upper and lower boundaries of the coarse bounding box as upper and lower boundaries of the fine bounding box respectively, and determine left and right boundaries of the predicted bounding box as left and right boundaries of the fine bounding box respectively; in a case that the angle is larger than 45°, determine upper and lower boundaries of the coarse bounding box as left and right boundaries of the fine bounding box respectively, and determine left and right boundaries of the predicted bounding box as upper and lower boundaries of the fine bounding box respectively.

According to an implementation mode of the apparatus for training a character detector based on weak supervision of the present disclosure, the apparatus further includes a parameter updating module 500 configured to: calculate a loss function of the neural network model according to the fine bounding box, and update a parameter value of the neural network model through an error back-propagation algorithm, based on the loss function. The fine character bounding box obtained by online adjustment is regarded as the tag of the detector learning, and used to guide loss function calculation of the model learning. A parameter of the character detector is updated through a gradient back-propagation mechanism to achieve the purpose of model learning.

In a possible design, the structure of the apparatus for training a character detector based on weak supervision includes a processor and a memory, the memory being used to store a program, which supports the apparatus for training a character detector based on weak supervision to execute the abovementioned method for training a character detector based on weak supervision, the processor being configured to execute the program stored in the memory.

According to embodiments of the present disclosure, there is provided a character detection system, including: one or more processors; a storage device for storing one or more programs; the one or more programs, when executed by said one or more processors, enable said one or more processors to implement the abovementioned method.

According to embodiments of the present disclosure, there is provided a computer readable storage medium in which a computer program is stored, wherein the computer program, when executed by a processor, implements the abovementioned method.

A technical solution among the above technical solutions has the following advantages or advantageous effects: embodiments according to the present disclosure enable the character detector to use more character detection sets to train (particularly based on a data set only having word- or text bar-level annotation) so that the model is substantially improved in respect of character-level detection precision, and the character information mining precision in the current OCR technology can be enhanced substantially.

Another technical solution among the above technical solutions has the following advantages or advantageous effects: text annotation form under some more general-purpose character scenarios such as in the case of distortion and projection change employs a polygon. The above technical solution has a very high success rate under these character scenarios.

In embodiments of the present disclosure, it is possible to generate character-level annotation information according to already-existing word- or text bar-based overall annotation, thereby greatly easing input of manpower and material resources into character annotation under character-associated business scenarios (transform needing character-level precise annotation into only needing word- or text bar-based overall annotation), and it is possible to enable character information mining precision of the current OCR technology in texts and pictures of multiple practical business (including scenarios such as natural street view, advertisement, bill, video and menu) to be improved substantially, help to bring about more streaming to the computer terminal and mobile terminal, and bring about better experience of products to more users.

In the depictions of the description, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Furthermore, the described specific features, structures, materials, or characteristics may be combined in any suitable manner in one or more embodiments or examples. In addition, in the case of no mutual contradiction, those skilled in the art may incorporate or combine different embodiments or examples and features of different embodiments or examples described in the description.

In addition, terms "first" and "second" are only used for illustration purpose and cannot be understood as indicating or implying relative importance or implicitly indicating the number of the meant technical features. Hence, a feature defined by "first" and "second" may explicitly or implicitly indicate that at least one said feature is included. In the depictions of the present disclosure, "a plurality of" means two or more, unless otherwise definitely and specifically defined.

Any procedure or method described in the flow charts or described in any other way herein may be understood to include a module, fragment or portion of code representing executable instructions that include one or more steps for implementing a particular logical function or process. Moreover, the scope of preferred embodiments of the present disclosure includes other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step shown in the flow chart, for example or described in other manners herein, an ordered list of executable instructions for realizing the logical function, may be specifically achieved in any computer readable medium for use by the instruction execution system, device or equipment (such as the system based on a computer, the system including a processor or other systems capable of obtaining the instruction from the instruction execution system, device and equipment and executing the instruction), or for use in combination with the instruction execution system, device and equipment. As to the specification, "the computer readable medium" may be any device adapted for including, storing, communicating, propagating or transferring programs for use by or in combination with the instruction execution system, device or equipment. More specific examples (non-exhaustive list) of the computer readable storage medium include: an electronic connection (an electronic device) with one or more wires, a portable computer disc box (a magnetic device), a random access memory (RAM), a read only memory (ROM), an erasable programmable read-only memory (EPROM or a flash memory), an optical fiber device and a portable compact disk read-only memory (CDROM). In addition, the computer readable storage medium may even be a paper or other appropriate medium on which the program can be printed, this is because, for example, the paper or other appropriate medium may be optically scanned and then edited, decrypted or processed in other appropriate manners when necessary to obtain the program in an electric manner, and then the program may be stored in the computer memory.

It should be appreciated that each part of the present disclosure may be realized by the hardware, software, firmware or their combinations. In the above embodiments, a plurality of steps or methods may be realized by the software or firmware stored in the memory and executed by the appropriate instruction execution system. For example, if the steps or methods are realized by the hardware, likewise in another embodiment, the steps or methods may be realized by one or a combination of the following techniques known in the art: a discrete logic circuit having a logic gate circuit for realizing a logic function for a data signal, an application-specific integrated circuit having an appropriate combination logic gate circuit, a programmable gate array (PGA), a field programmable gate array (FPGA), etc.

It should be understood by those skilled in the art that all or some of the steps in the method of the above embodiments can be implemented by instructing related hardware via a program, the program may be stored in a computer readable storage medium, and the program includes one or a combination of the steps of the method embodiments when the program is executed. The implementation mode of the apparatus corresponds to the implementation mode of the method. Therefore, the implementation mode of the apparatus is described briefly. Reference may be made to depictions of the implementation mode of the method for relevant depictions of the apparatus.

In addition, function units of the embodiments of the present disclosure may be integrated in a processing module, or these units may exist separately and physically, or two or more units are integrated in a module. The integrated module may be realized in a form of hardware or in a form of a software function module. When the integrated module is realized in a form of the software function module and is sold or used as a standalone product, the integrated module may be stored in a computer readable storage medium. The storage medium stated here may be a read only memory, a magnetic disk, an optical disk or the like.

What are described above are only specific implementation modes of the present disclosure, but the extent of protection of the present disclosure is not limited to this.

Without departing from the technical scope revealed by the present disclosure, those skilled in the art can readily envisage various variations or substitutes, which are all covered by the extent of protection of the present disclosure. Hence, the extent of protection of the present disclosure should be subject to the protection scope of the appended claims.

What is claimed is:

1. A method for training a character detector based on weak supervision, comprising:
   inputting coarse-grained annotation information of a to-be-processed object, the coarse-grained annotation information including a whole bounding outline of a word, text bar or line of the to-be-processed object;
   dividing the whole bounding outline of the coarse-grained annotation information, to obtain a coarse bounding box of a character of the to-be-processed object;
   obtaining a predicted bounding box of the character of the to-be-processed object through a neural network model from the coarse-grained annotation information; and
   determining a fine bounding box of the character of the to-be-processed object as character-based annotation of the to-be-processed object, according to the coarse bounding box and the predicted bounding box,
   wherein determining the fine bounding box of the character of the to-be-processed object according to the coarse bounding box and the predicted bounding box comprises:
   determining whether both a first condition and a second condition are satisfied, the first condition being that a confidence of the predicted bounding box is larger than a preset confidence threshold, and the second condition being that an overlap ratio of the coarse bounding box to the predicted bounding box is larger than a preset overlap ratio threshold;
   adjusting the coarse bounding box based on the predicted bounding box, to generate the fine bounding box, in a case that both the first condition and the second condition are satisfied; and
   determining boundaries of the coarse bounding box as boundaries of the fine bounding box, in a case that at least one of the first condition and the second condition is not satisfied.

2. The method according to claim 1, wherein the whole bounding outline comprises a polygon.

3. The method according to claim 1, wherein adjusting the coarse bounding box based on the predicted bounding box, to generate the fine bounding box comprises:
   determining whether an angle between a long axis and a transverse axis of the whole bounding outline of the coarse-grained annotation information is less than or equal to 45°;
   in a case that the angle is less than or equal to 45°, determining upper and lower boundaries of the coarse bounding box as upper and lower boundaries of the fine bounding box respectively, and determining left and right boundaries of the predicted bounding box as left and right boundaries of the fine bounding box respectively;
   in a case that the angle is larger than 45°, determining upper and lower boundaries of the coarse bounding box as left and right boundaries of the fine bounding box respectively, and determining left and right boundaries of the predicted bounding box as upper and lower boundaries of the fine bounding box respectively.

4. The method according to claim 1, wherein after determining the fine bounding box of the character of the to-be-processed object according to the coarse bounding box and the predicted bounding box, the method further comprises:
   calculating a loss function of the neural network model according to the fine bounding box; and updating a parameter value of the neural network model through an error backpropagation algorithm, based on the loss function.

5. An apparatus for training a character detector based on weak supervision, the apparatus comprising:
   one or more processors; and
   a storage device for storing one or more programs, wherein
   the one or more programs, when executed by said one or more processors, enable said one or more processors to:
   input coarse-grained annotation information of a to-be-processed object, the coarse-grained annotation information including a whole bounding outline of a word, text bar or line of the to-be-processed object;
   divide the whole bounding outline of the coarse-grained annotation information, to obtain a coarse bounding box of a character of the to-be-processed object;
   obtain a predicted bounding box of the character of the to-be-processed object through a neural network model from the coarse-grained annotation information; and
   determine a fine bounding box of the character of the to-be-processed object as character-based annotation of the to-be-processed object, according to the coarse bounding box and the predicted bounding box,
   wherein the one or more programs, when executed by said one or more processors, enable said one or more processors further to:
   determine whether both a first condition and a second condition are satisfied, the first condition being that a confidence of the predicted bounding box is larger than a preset confidence threshold, and the second condition being that an overlap ratio of the coarse bounding box to the predicted bounding box is larger than a preset overlap ratio threshold;
   adjust the coarse bounding box based on the predicted bounding box, to generate the fine bounding box, in a case that both the first condition and the second condition are satisfied; and
   determine boundaries of the coarse bounding box as boundaries of the fine bounding box, in a case that at least one of the first condition and the second condition is not satisfied.

6. The apparatus according to claim 5, wherein the whole bounding outline comprises a polygon.

7. The apparatus according to claim 6, wherein the one or more programs, when executed by said one or more processors, enable said one or more processors further to:
   equally divide the polygon of the coarse-grained annotation information into N portions, wherein a direction perpendicular to a long axis of the polygon is an extension direction of a division line; and N is the number of character in the coarse-grained annotation information, or is an integer obtained by rounding a quotient obtained by dividing a length of the long axis of the polygon by a length of the shortest edge of the polygon.

8. The apparatus according to claim 5, wherein the one or more programs, when executed by said one or more processors, enable said one or more processors further to:
   determine whether an angle between a long axis and a transverse axis of the whole bounding outline of the coarse-grained annotation information is less than or equal to 45°;

in a case that the angle is less than or equal to 45°, determine upper and lower boundaries of the coarse bounding box as upper and lower boundaries of the fine bounding box respectively, and determine left and right boundaries of the predicted bounding box as left and right boundaries of the fine bounding box respectively;

in a case that the angle is larger than 45°, determine upper and lower boundaries of the coarse bounding box as left and right boundaries of the fine bounding box respectively, and determine left and right boundaries of the predicted bounding box as upper and lower boundaries of the fine bounding box respectively.

9. The apparatus according to claim 5, wherein the one or more programs, when executed by said one or more processors, enable said one or more processors further to: calculate a loss function of the neural network model according to the fine bounding box, and update a parameter value of the neural network model through an error back-propagation algorithm, based on the loss function.

10. A non-transitory computer readable storage medium in which a computer program is stored, wherein the computer program, when executed by a processor, enables the processor to:

input coarse-grained annotation information of a to-be-processed object, the coarse-grained annotation information including a whole bounding outline of a word, text bar or line of the to-be-processed object;

divide the whole bounding outline of the coarse-grained annotation information, to obtain a coarse bounding box of a character of the to-be-processed object;

obtain a predicted bounding box of the character of the to-be-processed object through a neural network model from the coarse-grained annotation information; and determine a fine bounding box of the character of the to-be-processed object as character-based annotation of the to-be-processed object, according to the coarse bounding box and the predicted bounding box, wherein the computer program, when executed by the processor, enables the processor further to:

determine whether both a first condition and a second condition are satisfied, the first condition being that a confidence of the predicted bounding box is larger than a preset confidence threshold, and the second condition being that an overlap ratio of the coarse bounding box to the predicted bounding box is larger than a preset overlap ratio threshold;

adjust the coarse bounding box based on the predicted bounding box, to generate the fine bounding box, in a case that both the first condition and the second condition are satisfied; and determine boundaries of the coarse bounding box as boundaries of the fine bounding box, in a case that at least one of the first condition and the second condition is not satisfied.

11. The non-transitory computer readable storage medium according to claim 10, wherein the whole bounding outline comprises a polygon.

12. The non-transitory computer readable storage medium according to claim 11, wherein the computer program, when executed by the processor, enables the processor further to:

equally divide the polygon of the coarse-grained annotation information into N portions, wherein a direction perpendicular to a long axis of the polygon is an extension direction of a division line; and N is the number of character in the coarse-grained annotation information, or is an integer obtained by rounding a quotient obtained by dividing a length of the long axis of the polygon by a length of the shortest edge of the polygon.

13. The non-transitory computer readable storage medium according to claim 10, wherein the computer program, when executed by the processor, enables the processor further to:

determine whether an angle between a long axis and a transverse axis of the whole bounding outline of the coarse-grained annotation information is less than or equal to 45°;

in a case that the angle is less than or equal to 45°, determine upper and lower boundaries of the coarse bounding box as upper and lower boundaries of the fine bounding box respectively, and determine left and right boundaries of the predicted bounding box as left and right boundaries of the fine bounding box respectively;

in a case that the angle is larger than 45°, determine upper and lower boundaries of the coarse bounding box as left and right boundaries of the fine bounding box respectively, and determine left and right boundaries of the predicted bounding box as upper and lower boundaries of the fine bounding box respectively.

14. The non-transitory computer readable storage medium according to claim 10, wherein the computer program, when executed by the processor, enables the processor further to: calculate a loss function of the neural network model according to the fine bounding box, and update a parameter value of the neural network model through an error back-propagation algorithm, based on the loss function.

* * * * *